United States Patent [19]

Kühnel et al.

[11] Patent Number: 4,751,121
[45] Date of Patent: Jun. 14, 1988

[54] MULTI-PLY SELF-ADHESIVE AND DEEP-DRAWABLE PROTECTIVE SHEET, ESPECIALLY FOR AUTOMOTIVE VEHICLES

[75] Inventors: Werner Kühnel, Neunkirchen-Schoneshof; Manfred Simm, Troisdorf; Paul Spielau, Troisdorf; Rudolf Kautz, Hennef, all of Fed. Rep. of Germany; Johan Harmsen, Allphen/Ryn; Henk van der Mey, Hazerwoude Rysdyk, both of Netherlands

[73] Assignee: Huels Troisdorf Aktiengesellschaft, Troisdorf, Fed. Rep. of Germany

[21] Appl. No.: 867,551

[22] Filed: May 28, 1986

[30] Foreign Application Priority Data

May 28, 1985 [DE] Fed. Rep. of Germany ....... 3519064

[51] Int. Cl.⁴ .............................. B32B 7/06; B32B 7/12
[52] U.S. Cl. ...................................... 428/40; 428/214; 428/352; 428/355; 428/521
[58] Field of Search ................ 428/40, 214, 352, 355, 428/521

[56] References Cited

U.S. PATENT DOCUMENTS

| | | | |
|---|---|---|---|
| 3,904,470 | 9/1975 | Fukuki et al. ................ | 428/516 X |
| 4,244,860 | 1/1981 | Kuhnel et al. ................ | 524/263 |
| 4,319,001 | 3/1982 | Spielau et al. ................ | 525/240 X |
| 4,319,004 | 3/1982 | Spielau et al. ................ | 525/240 X |
| 4,319,005 | 3/1982 | Spielau et al. ................ | 525/240 |
| 4,433,073 | 2/1984 | Sano et al. ................ | 523/201 |
| 4,435,466 | 3/1984 | Kuhnel et al. ................ | 428/516 X |
| 4,459,380 | 7/1984 | Vostovich ................ | 524/94 |
| 4,511,619 | 4/1985 | Kuhnel et al. ................ | 428/516 X |
| 4,634,735 | 1/1987 | Thiersault et al. ................ | 525/88 |

FOREIGN PATENT DOCUMENTS 0052469 5/1982 European Pat. Off. .

*Primary Examiner*—Henry F. Epstein
*Attorney, Agent, or Firm*—Antonelli, Terry & Wands

[57] ABSTRACT

The invention describes a multi-ply, self-adhesive and deep-drawable protective sheet, especially for the internal and external outfitting of automotive vehicles, consisting of a carrier sheet containing a thermoplastic synthetic resin based on an ethylene-propylene-diene terpolymer and/or an ethylene-propylene copolymer and a homo- and/or copolymer of propylene, small amounts of fillers and conventional additives; a pressure-sensitive adhesive layer based on an alkyl acrylate and/or methacrylate and/or a copolymerizable, ethylenically unsaturated monomer, such as acrylic acid, and a cover layer of a unilaterally siliconized polyolefin film.

8 Claims, 1 Drawing Sheet

MULTI-PLY SELF-ADHESIVE AND DEEP-DRAWABLE PROTECTIVE SHEET, ESPECIALLY FOR AUTOMOTIVE VEHICLES

This invention relates to a multi-ply, self-adhesive and deep-drawable protective sheet, especially for the internal and external outfitting of automotive vehicles, consisting of a carrier layer containing a thermoplastic synthetic resin, fillers and conventional additives; a pressure-sensitive adhesive layer; optionally a primer layer for the adhesive layer applied to the carrier layer; and a cover layer of a release film or release paper on the adhesive layer.

Multiple-layer, self-adhesive protective sheets based on plasticizer-containing an ethylene vinyl acetate-polyvinyl chloride (EVA-PVC) copolymer are known, for example, from DOS No. 3,219,645 serving, in particular, as protection against impact of stones in automotive vehicles and being applied as a decorative sheet. These sheets have the disadvantage that they contain polyvinyl chloride since there is the danger, at high exhaust gas temperatures, of hydrogen chloride formation, promoting corrosion. Furthermore, brittleness can occur due to loss of plasticizer so that stone impact protection is reduced, especially at temperatures below 0° C. DOS No. 2,806,726 describes a protective layer for floors of automotive vehicles, designed as drumming insulation, which layer contains a carrier layer on the basis of polyolefins, especially ethylene-propylene elastomer, and at least 30% by weight, preferably at least 70% by weight of fillers based on bitumen, plasticizing materials, such as oils, and acoustically effective mineral substances, such as talc, ground shale, graphite, mica. This heavy sheet, which is predominantly soft-plastic and provides noise protection, is permanently bonded to the sheet metal of the car body by means of vulcanizing adhesives or heat-sealing adhesives. The high filler proportions of this sheet, however, reduce the strength properties of the sheet and, in case of calendered sheets, promote so-called crazing. Since the sheets are shaped during application onto the body parts, crazing is undesirable in any event for optical reasons. Also protection against stone impact is inadequate in this protective layer.

EP-OS No. 01 33 238 discloses multiple-layer sheets for automotive vehicles, likewise based on internally plasticized vinyl chloride polymers or based on plasticizer-containing polyvinyl chloride, exhibiting the same disadvantages as those in the protective sheet according to DOS No. 3,219,645.

The invention is based on the object of providing a multi-ply protective sheet usable for internal as well as external outfitting of automotive vehicles, this sheet being designed as a self-adhesive sheet with good deep drawability and exhibiting good strength values accompanied by good weatherability and long lifetime at high temperatures as well as at low temperatures, and showing, in particular, high resistance against stone impacts.

An optimal protective sheet combining the good properties of the conventional protective sheet and avoiding the disadvantages of the latter with a substantially increased stone impact resistance is characterized in accordance with the invention by the features that the carrier sheet contains 65–25% by weight of an ethylene-propylene-diene terpolymer (EPDM) and/or an ethylene-propylene copolymer (EPM) 35–75% by weight of a homopolymer and/or a copolymer of propylene 0–10% by weight of fillers, such as chalk, carbon black, silica and silicic anhydride, as well as additionally lubricants and stabilizers; that the adhesive layer is made up of a self-adhesive composition based on an alkyl acrylate and/or methacrylate and/or a copolymerizable, ethylenically unsaturated monomer, such as acrylic acid, and is crosslinked; and that a unilaterally siliconized polyolefin film is provided as the cover layer.

The invention has created a lightweight protective sheet of a synthetic resin which offers, along with great flexibility, a protection against stone impact, even at below-zero temperatures, that is substantially increased as compared with the heretofore known sheets. The protective sheet of this invention can also be mounted at the automotive vehicle in an appropriate coloration, satisfying besides the protective effect simultaneously esthetic viewpoints. The protective sheet of this invention obtains its superior properties of deep drawability, light weight, cold impact strength, and impact resistance, owing to the selected layers.

The carrier sheet of EPDM/EPM and polypropylene of this invention, free of filler or almost free of filler, meets, in conjunction with the special adhesive layer and the cover layer, an array of property requirements ensuring long lifetime and functional effectiveness in the field of application in the automobile industry.

These essential, required properties attained by the protective sheet of this invention are:
1. very good stone impact resistance—on account of the elastomeric carrier sheet in conjunction with the adhesive layer;
2. good low-temperature stability;
3. high tensile strength at break and high elongation;
4. high tear propagation resistance;
5. low moisture sensitivity;
6. good abrasion resistance of the carrier sheet;
7. good adhesion of the adhesive layer to the carrier sheet;
8. adequate gasoline resistance;
9. good light and weathering stability of the carrier sheet;
10. matte surfaces of the carrier sheet, suitable for embossing;
11. good deep drawability of the entire multi-ply protective sheet;
12. temperature stability of the molded part made from the protective sheet after deep drawing, i.e. good dimensional stability under heat;
13. no back shrinking under sunlight acting on a shaped part made from the protective sheet;
14. no crazing of the carrier sheet during shaping;
15. preservation of embossed pattern of the carrier sheet even during and after shaping;
16. simple handling of the protective sheet during attachment of the shaped part to the automotive vehicle;
17. easy possibility of correcting the position during mounting of the shaped part to the automotive vehicle since the pressure-sensitive adhesive layer is firmly bonded only after about 30 minutes so that detachment of the part in the mounting phase is feasible;
18. thin protective sheets mean low weight; and
19. corrosion protection.

It is suggested, in a further embodiment of the invention to select, for the carrier sheet, those thermoplastic synthetic resins and compositions which permit manufacture of the carrier sheet by extrusion as well as by calendering; in this connection, processing of polypropylene, which tends to become tacky very fast, is problematic. In order to optimally satisfy the requirements posed with regard to processability and mechanical properties of the carrier sheet or protective sheet, a partially crystalline ethylene-propylene copolymer and/or an ethylene-propylene-diene terpolymer made up of 65–82% by weight of ethylene, 18–35% by weight of propylene, 0–8% by weight of adiene tercomponent, especially ethylidene norbornene, having a melt index MFI (230/5) of 0.5–2.0 g/10 min and a tensile strength of at least $5 N/mm^2$, is utilized according to this invention for producing the carrier sheet. Preferred propylene homopolymers and/or propylene copolymers are those having a melt index MFI (190/5) that is smaller than 1 g/10 min, i.e. especially propylene homopolymers, statistical propylene copolymers, and block propylene copolymers with 5–20% by weight of copolymerized ethylene, exhibiting an especially low melt index. However, one must consider, during processing, i.e. manufacturing of the carrier sheet by calendering, that in this case polypropylene having a MFI (230° C./21.6 N) smaller than 0.1 g/10 min is no longer suitable for use inasmuch as it cannot be adequately calendered.

The partially crystalline ethylene-propylene-diene terpolymers selected according to this invention and utilized for the sheet, having a very high tensile strength and, respectively, tensile strength at break of at least 15 $N/mm^2$, preferably at least 20 $N/mm^2$, the degree of crystallinity of which is correlated with the DCS maximum temperature and amounts to at least about 40° C., in the preferred range at least about 43° C., make it possible in collaboration with the selected polypropylenes to manufacture the sheet by calendering or extrusion, with the aforedescribed properties.

Suitable as the tercomponent in this connection are, in particular, ethylidene norbornene, but also dicyclopentadiene, alkenyl norbornenes, alkadienes and cycloalkadienes.

Since the extent of crystallinity is also correlated with the ethylene content as well as with the tensile strength, a preferred embodiment of the invention provides to utilize ethylene-propylene-diene terpolymers having an ethylene content of at least 70% by weight.

The partially crystalline EPDM's also exhibit the advantage over the amorphous or almost amorphous EPDM's, with respect to processing technology, that they are obtained in crumb form and can also be pelletized and thus are readily meterable and mixable. In contrast thereto, the amorphous elastomers are rubbery and are present in lump or bale form; they cannot be pelletized without additives.

The DSC maximum temperature of the EPDM's is determined by means of the differential scanning calorimeter and also the heat of crystallization is measured thereby. Also the latter is a measure for the degree of crystallinity. The heat of crystallization of the ethylene-propylene-diene terpolymers utilized according to this invention should amount to at least 15 cal/g.

Since fillers generally reduce the strength properties of the carrier layer, fillers are added in case of the protective sheet of this invention only in small amounts for the carrier sheet; these fillers can involve, on the one hand, inorganic pulverulent fillers, such as chalk, lime, talc or kaolin or, alternatively and preferably, also so-called reinforcing fillers, such as semiactive or active carbon blacks, silica, silicic anhydride, glass fibers, or mixtures of the aforementioned fillers. Also mica or barite can be provided in small amounts.

The carrier sheet additionally contains stabilizers and antiaging materials for polyolefins, especially based on sterically hindered phenolic antioxidants, phenolic phosphites, thioesters of aliphatic carboxylic acids, and similar compounds. Suitable lubricants for processing that are added are especially metallic salts of carboxylic acids, such as, for example, calcium soaps, calcium stearate, zinc stearate, and also, as further processing aids, especially montanic acid esters and/or hydrogenated hydrocarbon resins.

It is, of course, also possible furthermore to add colorants to the carrier layer, but these should also be very finely divided, just as the other fillers, so that they will not exert a disadvantageous, disturbing influence during further processing by deep drawing of the protective sheet. Suitable colorants are, besides dyes, pigments such as titanium dioxide, also carbon black in small amounts, the latter additionally providing the advantage of enhancing weatherability of the carrier layer. In this context, even small proportions in the carrier layer are adequate.

Furthermore, plasticizing materials, such as aliphatic and/or naphthenic extender oils, can also be added to the carrier layer in small amounts to improve processability of the ethylene-propylene polymers utilized.

A preferred embodiment of the carrier layer according to this invention intended for the protective sheet, with high proportions of elastomer, which exhibits especially good properties under low temperatures, such as high impact resistance, is distinguished by the composition. The carrier layer therein is produced as a sheet by calendering or extrusion, calendered sheets having thicknesses starting with 0.2 mm up to 0.75 mm, and extruded sheets exhibiting thicknesses of about 0.6 mm to about 2 mm. It is then possible to manufacture especially thick sheets by doubling or tripling.

For applications in an automotive vehicle where no extreme low-temperature impact resistance is required, a carrier sheet is proposed according to this invention which has a somewhat higher hardness setting.

The carrier sheet according to the invention can be finished especially well by embossing the surface in a matte or grained texture. The quality of the material for the carrier sheet becomes apparent in this process, since even during the subsequent shaping of the protective sheet and carrier sheet, for example by vacuum deep drawing, the embossing on the surface of the carrier sheet is perfectly preserved. It is also possibe to optionally imprint the surface of the carrier sheet.

Quite preferably, pressure-sensitive contact adhesives based on acrylates are utilized for the adhesive layer; these are dissolved in a customarily 30–40% strength adhesive solution with suitable solvents, such as isopropanol, hexane, toluene, ethyl acetate, or the like, or mixtures thereof; suitable crosslinking agents or catalysts are added thereto for crosslinking, such as organometallic compounds, e.g. titanium acetylacetonate. This solution is preferably applied to the carrier sheet.

After evaporation of the solvent, the layers are joined to form the protective sheet. In a further embodiment of the invention, the provision is made to apply the adhesive layer, i.e. the contact adhesive composition, in a thickness corresponding to a weight per unit area of about 40–100 $g/m^2$ (solid proportions). In order to increase adhesion between carrier sheet and adhesive layer, the surface of the carrier sheet to be bonded is pretreated in a suitable way, preferably by corona discharge treatment. It is also possible to apply a suitable primer coating.

The pressure-sensitive adhesives on acrylate basis, especially suitable for the invention, exhibit shear stability, aging resistance, permanent stability, moisture resistance, solvent and gasoline resistance, weatherability, and dimensional stability. The pressure-sensitive adhesives make it readily possible to effect attachment and changing of position during mounting. Even after hardening of the pressure-sensitive adhesive, it is possible for purposes of repair to remove the part formed by the protective sheet again from the car body with the exertion of a certain force.

Preferably, a somewhat thicker release sheet is utilized as the cover layer for the adhesive layer in the protective sheet of this invention, which release sheet also can be shaped with special ease. Preferred are, for example, polypropylene films having a thickness of about 50–150 μm. In order to ensure ready detachment of the cover layer before the part made of the protective sheet is cemented to the automotive vehicle, the polyolefin film should always exhibit a siliconized side facing the adhesive layer, in the manner of a release paper.

The protective sheet of this invention is utilized, in particular, for the lining of automobile body parts, namely in the external zone as well as internal zone. In this context, preformed, finished paneling members are preferably manufactured from the protective sheet, for example by deep drawing, and applied. They serve, on the one hand, as protection against mechanical damage, such as stone impacts, scratching, and so forth, as well as, on the other hand, as corrosion protection. All external car and body parts exposed to stone impact, such as, for example, door sill regions, wheel boxes, floor and sidewall regions, frontal portions, can be covered with protective sheet or parts shaped therefrom. Also window frames, areas behind license plates, etc., can be protected with the use of this invention. The high flexibility of the protective sheet permits a high degree of deformation and thus a good adaptation to the existing configurations. In the interior zone of the automotive vehicle, baggage spaces, vehicle floors, inner door panelings, tunnel covers, etc., can be covered entirely or partially with the protective sheet according to this invention. The protective sheet of this invention can be dyed in accordance with the wishes of the automobile industry. The protective sheet in accordance with this invention is suitable for use directly during the manufacture of the automobile, as well as for subsequent application, and also for repairs, even after removal of a damaged protective sheet section, for example.

An essential characteristic of the protective sheet of this invention is its deep drawability, i.e. the possibility of producing preformed parts by thermoforming, especially deep drawing, for example with the use of vacuum exerted on a corresponding mold. In this connection, the protective sheet of the invention must be deep-drawable in its entirety, i.e. with all its layers. Only upon subsequent application of the preformed part made of the protective sheet of this invention is the cover layer pulled off and the part, with the use of pressure, bonded by adhesion to the automotive vehicle. The adhesive layer is set so that it results, after application, in a permanent and firm bond within a short period of time, but this bond can be released again in case of repairs, using a certain amount of strength, i.e. the protective sheet can optionally be removed again.

The protective sheet of this invention, however, is also flexible and deformable to such an extensive degree that it can be be applied, in case of small degrees of deformation desired, even without preforming onto a corresponding area of the automotive vehicle. After shaping, for example by deep drawing or, alternatively, also during cold forming, this sheet will retain, after cooling, the configuration enforced thereon.

It is desirable in many cases for the protective sheet and/or the molded part made of the protective sheet to exhibit an embossed and dulled surface. The protective sheet of this invention affords the substantial advantage that the surface embossed during manufacture, for example after calendaring or extrusion, retains its embossed pattern with deep drawing; this is due to the good heat deflection temperature of the carrier sheet.

The invention is illustrated by way of example in the drawing wherein

Figure 1:
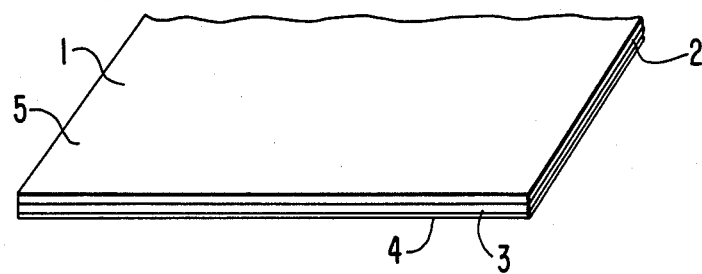
FIG. 1 is a view of the protective sheet.

FIG. 1 shows schematically the structure of the self-adhesive, multi-ply, and deep-drawable protective sheet 1. The carrier sheet 2, which simultaneously is to constitute the protective layer for the component to be protected, for example the bottom of an automobile, consists essentially of a calendered or extruded synthetic resin sheet based on EPDM and/or EPM and propylene homopolymer and/or propylene copolymer. This carrier sheet 2, which can optionally be embossed on its top face 5, is adhesively bonded on its bottom face to the pressure-sensitive adhesive layer 3. The pressure-sensitive adhesive layer 3 is covered by the cover sheet 4, for example a thin polyolefin film. The multiple-layer protective sheet 1 shown in FIG. 1 is shaped, for example, into a molded part according to FIG. 2. This shaping step can take place, for example, by means of deep drawing, wherein the multi-ply protective sheet is preheated to a temperature of about 125°–150° C. and then molded against a mold by means of vacuum. In this molding procedure, the topside of the carrier sheet 2 comes into contact with the mold.

Figure 2:
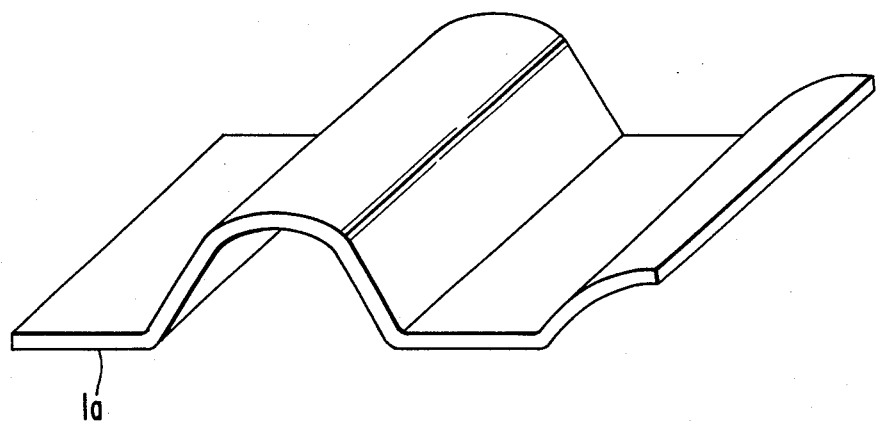
FIG. 2 is a view of a deep-drawn molded part.

However, it is also possible to press the multiply protective sheet 1 according to FIG. 1 into the desired shape by means of a compression mold, likewise with preheating of the protective sheet. The molded part 1a shown by way of example in FIG. 2 is then applied to the appropriate area of the automotive vehicle by pulling off the cover layer 4, for example the polyolefin film, and pressing the molded part 1a in place. Solidification of the adhesive bond takes place within a few hours so that the secure, permanent placement of the molded part is ensured.

The structure of the multi-ply protective sheet of this invention will be described below with reference to examples.

The following methods are utilized for testing the properties:

MFI (190/5) and, respectively, MFI (230/5) g/10 min according to DIN 53735 tensile strength at break according to DIN 53455 elongation at break according to DIN 53455 stone impact test with stones according to ASTM D-968 tensile stress at yield, DIN 53455

EXAMPLE 1 Production of Carrier Sheet

A pourable mixture is produced in a mixer that can be heated and cooled by processing 60 parts by weight of polypropylene copolymer with an ethylene content of 10% and a MFI (190/5) of 0.8 g/10 min with 40 parts by weight of EPDM having a Mooney viscosity ML(1+4) 100° C. of 85, a MFI (230/5) of 0.8 g/10 min and an ethylene content of 67% by weight, a propylene content of 30% by weight and an ethylidene norbornene content of 3% by weight with 0.45 part by weight of stabilizer, 0.15 part by weight of lubricant and 2 parts by weight of colorant; the mixture is plasticized and homogenized in a twin-screw unit at temperatures of up to 200° C. and introduced into a rolling mill. From the latter, the composition is fed, at a temperature of about 180°-190° C., to a calender and drawn into a sheet of 0.75 mm. At the outlet of the calender, an embossing device is provided, producing the desired surface texture at an embossing temperature of about 120° C. The sheet has a tensile strength at break the longitudinal extension of 28 N/mm$^2$ and an elongation at break in the longitudinal extension of 635%.

EXAMPLE 2 Production of a Carrier Sheet

In a mixer that can be heated and cooled, 47 parts by weight of the polypropylene copolymer cited in Example 1 is premixed with 53 parts by weight of the EPDM from Example 1 and the remaining additives of Example 1; the mixture is introduced into a twin-shaft kneader and plasticized at 170°-180° C., and fed into a rolling mill with temperatures of about 180°-200° C. The composition, plasticized at about 190° C. is charged via a strainer into the calender; the composition is calendered into a sheet having a thickness of 0.8 mm with embossing being carried out subsequently.

The sheet, 0.8 mm thick, exhibits a tensile strength at break in the longitudinal direction of 26.5 N/mm$^2$ and an elongation at break in the longitudinal extension of 650%, and a tensile stress at yield in the longitudinal direction of 10.6 N/mm$^2$.

EXAMPLE 3

In a mixer that can be heated and cooled, 42 parts by weight of a polypropylene homopolymer having a density of 0.9 g/ml and a MFI (190/5) of 0.7 g/10 min is premixed with 58 parts by weight of the EPDM of Example 1, plasticized and homogenized in an internal mixer, and fed via a rolling mill to the calender, being drawn into a sheet having a thickness of 0.8 mm and embossed. The sheet has a tensile strength at break in the longitudinal extension of 25 N/mm$^2$ and an elongation at break in the longitudinal extension of 680%.

The carrier sheets produced according to Examples 1-3 are then subjected to a corona treatment on the side subsequently to be bonded to the adhesive layer.

The pressure-sensitive adhesive composition, made up of a 35% strength solution (35% by weight solids content) of a pressure-sensitive adhesive based on acrylates, such as, for example, 52.5 parts by weight of 2-ethylhexyl acrylate, 37.5 parts by weight of methyl acrylate, and 10 parts by weight of acrylic acid, as well as crosslinking agents, are spread onto the pretreated side of the carrier sheet according to Examples 1-3; after evaporation of the solvent and drying, the thus-applied pressure-sensitive adhesive composition has a weight per unit area of 60 g/m$^2$. Drying can take place at elevated temperatures of about 60°-120° C. The thus-coated carrier sheets are laminated according to conventional methods to the release film to produce the protective sheet. A polyethylene or polypropylene film having a thickness of 80 μm and 120 μm, respectively, is selected as the release film or cover layer, this film being coated on one side with a silicone release layer.

Cut-to-size punched-out sections corresponding to the configuration of the desired part are made from the protective sheet for producing the paneling elements which are then molded into the desired shape by the deep-drawing method, especially vacuum deep drawing, under preheating to temperatures of about 120°-150° C.

The multiple-layer protective sheet can be shaped by this procedure perfectly, without crease formation and without exhibiting crazing.

Other deep drawing methods can also be utilized, such as the vacuum pressure forming with male or female mold.

What is claimed is:

1. A multi-ply, self-adhesive and deep-drawable protective sheet for the internal and external outfitting of automotive vehicles, comprising a carrier sheet containing a thermoplastic synthetic resin, a pressure-sensitive adhesive layer, and a cover layer of a release film on the adhesive layer; said carrier sheet containing
   65-25% by weight of at least one partially crystalline non-vulcanized polymer selected from the group consisting of ethylene-propylene-diene terpolymer (EPDM) and ethyolene-propylene copolymer with an ethylene content of at least 65% by weight, with a melt index MFI (230/15) of 0.5-2.0 g/10 min. and with a tensile strength of at least 5 N/mm2;
   35-75% by weight of at least one propylene polymer selected from the group consisting of homopolymer and a copolymer of propylene with a propylene content of at least 80% by weight, said propylene polymer having a melt index MFI (190/5) of 0.1-1 g/10 min.;
   0-10% by weight of filler comprising at least one of chalk, carbon black, silica, and a silicic anhydride;
   said adhesive layer comprising a crosslinked self-adhesive acrylic based composition containing an at least one of an alkyl acrylate, an alkyl methacrylate and a copolymerizable ethyleneically unsaturated monomer; and
   said cover layer comprises a unilaterally siliconized polyolefin film.

2. A protective sheet according to claim 1, wherein said adhesive layer has a thickness corresponding to a weight per unit area of about 40-100 g/m$^2$ and said polyolefin film is a polypropylene film having a thickness of about 50-150 μm.

3. A protective sheet according to claim 1, wherein the partially crystalline polymer comprises
   65-82% by weight of ethylene
   18-35% by weight of propylene
   0-8% by weight of a diene tercomponent.

4. A protective sheet according to claim 1 wherein the carrier sheet is produced in a thickness of about 0.2-2 mm by calendering or extrusion of a polymeric admixture containing
   60-40% by weight of at least one of EPDM and EPM,
   40-60% by weight of at least one of the homopolymer and the copolymer of propylene,
   0-6% by weight of the filler,
   and, per 100 parts by weight of the admixture,
   0.1-1.0 part by weight of stabilizer including sterically hindered phenolic antioxidants, phenolic phosphites or, thioesters of aliphatic carboxylic acids, 0.1–2 parts by weight of lubricant including metallic salts of carboxylic acids, montanic acid esters, or hydrogenated hydrocarbon resins,
0–5 parts by weight of a colorant,
0–4 parts by weight of an aliphatic and/or naphthenic extender oils,
said sheet exhibiting in a longitudinal direction a tensile strength of at least 24 N/mm$^2$ and an elongation of at break of at least 450%.

5. A protective sheet according to claim 1 wherein the carrier sheet is produced in a thickness of about 0.2–2 mm by calendering or extrusion of a polymeric admixture containing
45–25% by weight of at least one of EPDM and EPM,
75–55% by weight of at least one of the homopolymer and the copolymer of propylene,
0–6% by weight of the filler,
and, per 100 per 100 parts by weight of the admixture,
0.1–1.0 part by weight of stabilizer including sterically hindered phenolic antioxidants, phenolic phosphites, and/or thioesters of aliphatic carboxylic acids,
0.1–2 parts by weight of lubricant including metallic salts of carboxylic acids, montanic acid esters or hydrogenated hydrocarbon resins,
0–5 parts by weight of a colorant,
0–4 parts by weight of at least one of an aliphatic and naphtheic extender oils,
said sheet exhibiting in a longitudinal direction a tensile strength of at least 24 N/mm$^2$ and an elongation of at break of at least 450%.

6. A protective sheet according to claim 1, wherein the adhesive layer is provided in a thickness corresponding to a weight per unit area of about 40–100 g/m$^2$.

7. A protective sheet according to claim 1, wherein the carrier sheet is pretreated by means of corona discharge on the side joined to the adhesive layer.

8. A protective sheet according to claim 1, wherein the cover layer is a polypropylene film having a thickness of about 50–150 μm.

* * * * *